United States Patent
Savion et al.

(10) Patent No.: US 12,282,547 B2
(45) Date of Patent: Apr. 22, 2025

(54) ADAPTABLE FRAMEWORK FOR SPIKE DETECTION UNDER DYNAMIC CONSTRAINTS

(71) Applicant: Microsoft Technology Licensing, LLC, Redmond, WA (US)

(72) Inventors: Omer Savion, Elkana (IL); Andrey Karpovsky, Kiryat Motzkin (IL); Fady Naser El Deen, Daliyat el Carmel (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 422 days.

(21) Appl. No.: 17/734,348

(22) Filed: May 2, 2022

(65) Prior Publication Data

US 2023/0267199 A1   Aug. 24, 2023

Related U.S. Application Data

(60) Provisional application No. 63/312,691, filed on Feb. 22, 2022.

(51) Int. Cl.
G06F 21/55 (2013.01)

(52) U.S. Cl.
CPC ...... *G06F 21/554* (2013.01); *G06F 2221/034* (2013.01)

(58) Field of Classification Search
CPC . G06F 21/554; G06F 2221/034; G06F 21/552
See application file for complete search history.

(56) References Cited

U.S. PATENT DOCUMENTS

| | | | |
|---|---|---|---|
| 2016/0164721 A1* | 6/2016 | Zhang | H04L 41/142 709/224 |
| 2018/0004958 A1* | 1/2018 | Reinecke | G06F 21/566 |
| 2018/0278640 A1* | 9/2018 | Modani | G06F 16/9024 |
| 2020/0128047 A1* | 4/2020 | Biswas | H04L 63/1425 |
| 2023/0145484 A1* | 5/2023 | Jain | G06F 11/3065 718/1 |
| 2024/0281163 A1* | 8/2024 | Kumar | G06F 3/0608 |

OTHER PUBLICATIONS

Ensemble_Framework_for_User_Behavior_Anomaly_detection (Year: 2023).*
"International Search Report and Written Opinion Issued in PCT Application No. PCT/US23/011089", Mailed Date: May 9, 2023, 11 Pages.

* cited by examiner

*Primary Examiner* — Aftab N. Khan
(74) *Attorney, Agent, or Firm* — Weaver IP L.L.C.

(57) ABSTRACT

Methods, systems, apparatuses, and computer-readable storage mediums are described for adapting a spike detection algorithm. A first detection algorithm that monitors a first set of events in a computing environment is executed. A set of constraint metrics in the computing environment are monitored. Based on the monitored set of constraint metrics, a second detection algorithm is generated. The second detection algorithm is an adapted version of the first detection algorithm and is configured to monitor a second set of events in the computing environment. The second detection algorithm is executed, and a remediation action is performed in response to an abnormal event detected in the computing environment by the second detection algorithm.

20 Claims, 5 Drawing Sheets

ADAPTABLE FRAMEWORK FOR SPIKE DETECTION UNDER DYNAMIC CONSTRAINTS

CROSS-REFERENCE TO RELATED APPLICATIONS

This application claims priority to U.S. Provisional Patent Application No. 63/312,691, filed on Feb. 22, 2022, titled "Adaptable Framework for Spike Detection Under Dynamic Constraints," the entirety of which is incorporated by reference herein.

BACKGROUND

An Intrusion Detection System (IDS) is important security feature frequently implemented in systems that store sensitive data. In some instances, an IDS contains a tool for detecting a "spike" in in an environment, which may show as a sudden increase in an access of data that appears abnormal, such as an excessive amount of data accessed by an account associated with a user. A goal for an IDS is to provide alerts to security personnel of potential breaches or vulnerabilities in efficient manner, such that the security personnel may review each alert and/or take any appropriate action in response.

However, challenges exist in timely and accurate identification of such breaches or vulnerabilities. For instance, implementation of a spike detection tool in an IDS can result in excessive resource consumption (e.g., processing, storage, and/or network resources), resulting in a performance degradation of the system on which the IDS executes, which can delay the generation of critical alerts. As a result, systems and/or data can still be at a heightened risk of a breach even where such spike detection tools are implemented.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for adapting a spike detection algorithm. A first detection algorithm that monitors a first set of events in a computing environment is executed. A set of constraint metrics in the computing environment are monitored. Based on the monitored set of constraint metrics, a second detection algorithm is generated. The second detection algorithm is an adapted version of the first detection algorithm and is configured to monitor a second set of events in the computing environment. The second detection algorithm is executed, and a remediation action is performed in response to an abnormal event detected in the computing environment by the second detection algorithm.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
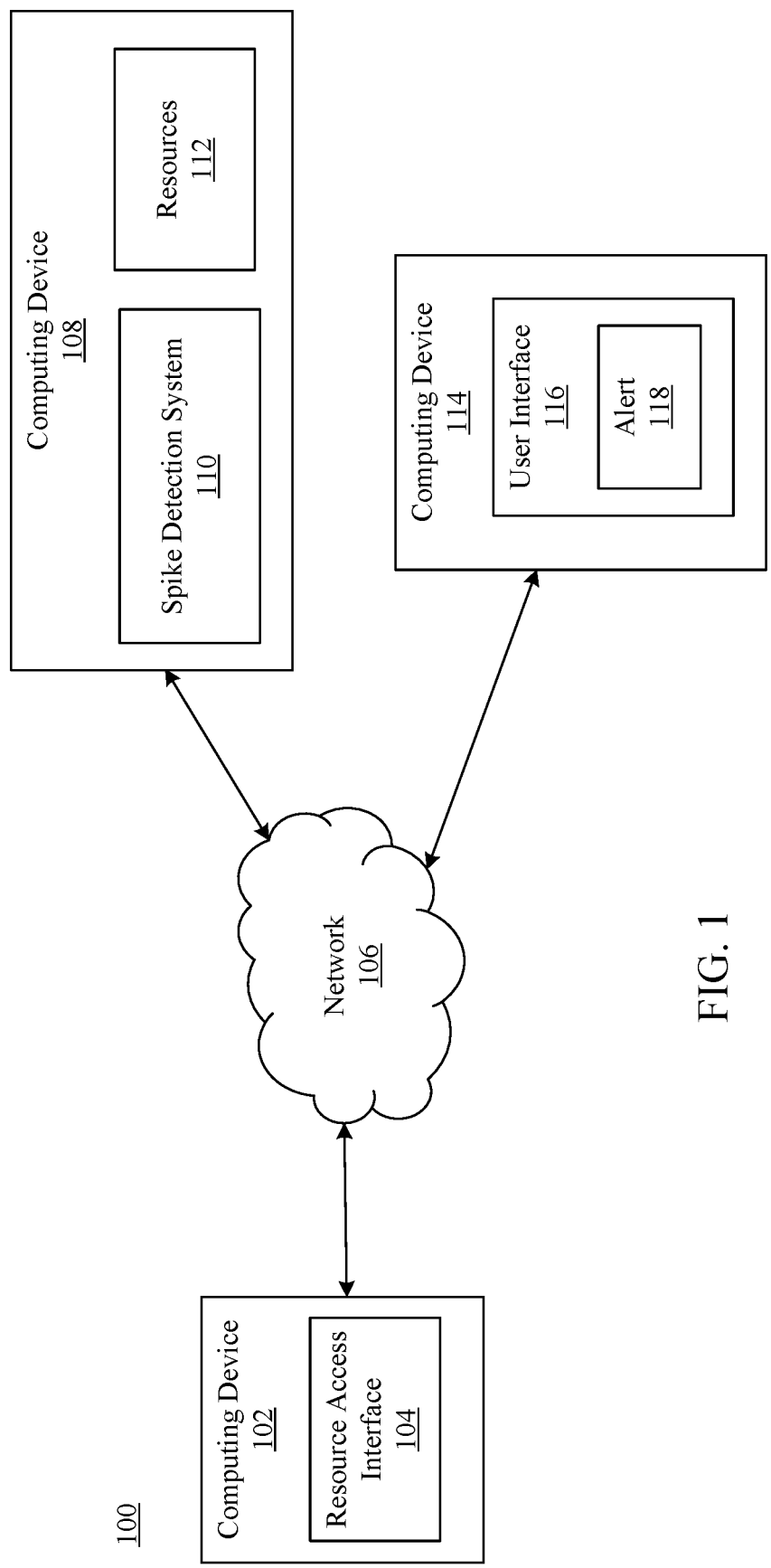
FIG. 1 shows a block diagram of a system for detecting a spike in a computing environment, in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

An Intrusion Detection Systems (IDS) is a vital security feature in many cloud services dealing with sensitive data. An IDS may contain a tool for detecting a "spike" in in an environment, such as an abnormal access of data (e.g., an excessive amount of data accessed by an account associated with a user). A goal of an IDS is to alert security personnel of potential breaches or vulnerabilities in the most efficient manner, such as by providing timely, accurate, concise and descriptive alerts.

However, many challenges exist when identifying such breaches or vulnerabilities. For instance, implementation of a spike detection tool in an IDS can result in excessive resource consumption (e.g., processing, storage, and/or network resources), resulting in a performance degradation of the system on which the IDS executes, which can delay the generation of critical alerts. In other examples, a detection algorithm may be working with limited compute and/or memory resources, making complex or heavy frameworks unusable. Where spike detection is being performed in a real-time streaming mode, such solutions can be even less suitable. In addition, an IDS may operate as part of preinstalled components (e.g., SQL server agent executing in an on-premise, or "OnPrem" instance), where installation and maintenance of external packages is problematic. Privacy considerations add more constraints, due to limited visibility of some datapoints, retention limits, etc.

Accuracy requirements of IDS signals are typically very high, both in terms of precision and recall: most of actual malicious events are expected to be detected (recall), otherwise the IDS service can lose credibility. Likewise, many raised alerts are expected to be related to malicious events (precision). Otherwise, alert churn can result, where customers receive many irrelevant signals.

Timeliness can be important as well, because mitigation and prevention of potential attack are typically started when the alert is received and/or passed to the relevant personnel. Thus, alerts with short Time-To-Detect (TTD) are desired, with real-time alerts (or near real-time alerts) real-time alerts being an optimal choice.

Embodiments described herein are directed to spike detection under various dynamic constraints. Such embodiments may be implemented in various systems, devices, and/or services, including but not limited to an IDS for an OnPrem SQL server, a cloud-based server, or other implementations. In examples, such dynamic constraints include conditions that can affect and/or can be affected by execution of a spike detection algorithm, such as memory, processing power, and/or networking limitations that may change over time (e.g., not constant).

Techniques described herein may be utilized to detect various anomalies in a computing environment, such as data exfiltration anomalies on a SQL Server in an OnPrem environment where the resources (e.g., processing and/or memory resources) of a customer are used, and in some cases can be very limited. Since an IDS is part of an agent running OnPrem in some implementations, dependence on external packages for time series analysis or spike detection can be problematic. Further, accuracy requirements are typically high and behavior patterns may differ between users and applications, which may make accurate spike detection more difficult. Accordingly, disclosed embodiments provide techniques in which spike detection may be lightweight and adaptable to changing performance (and other) constraints, yet still transparent, accurate, and adjustable to different scopes. Further, techniques described herein may analyze queries (which can be in the tens, hundreds or even more per second) to detect such anomalies, thus overcome challenges where a scale of data issue may be present.

In an example system for adapting a spike detection algorithm, a detector executes a first detection algorithm that monitors a first set of events in a computing environment. A constraint monitor is configured to monitor a set of constraint metrics in the computing environment. A detection algorithm adapter generates, based on the monitored set of constraint metrics, a second detection algorithm that is an adapted version of the first detection algorithm. The detector executes the second detection algorithm to monitor a second set of events in the computing environment. A remediator performs a remediation action in response to an abnormal event detected in the computing environment by the second detection algorithm.

Adapting a spike detection algorithm as described herein has numerous advantages, including but not limited to optimizing utilization of resources (e.g., processing, storage, and/or network resources) of the system executing the spike detection algorithm. For example, techniques described herein relate to monitoring constraint metrics of an environment in which a spike detection algorithm is executing. Such constraint metrics may include any measure of performance of a computing device or system, such as parameters relating to processor usage, memory usage, bandwidth usage. Based on the monitored metrics, a spike detection algorithm can be adapted (e.g., modified) to reduce resource utilization, such as where usage of any of the resources is heightened and/or causing an overall system performance degradation. The adapted spike detection algorithm may include, for instance, a reduction in the number of calculations used by the algorithm in detecting anomalies in the computing environment, reducing the amount of data stored or logged, reducing a frequency of network events, etc. In this manner, as will also be described in further detail below, the spike detection algorithm may be adapted to be more simplified and/or streamlined based on the monitored metrics, thereby improving resource utilization.

In addition to advantageously enabling improvements in resource utilization, techniques described herein enable improvements in the security of resources stored on and/or accessible via computing devices, improving the security of the computing devices generally, and improving the security of a network coupled thereto. For example, by adapting a spike detection algorithm based on constraint metrics in a computing environment, detection of anomalies in the computing environment such as data exfiltration may be performed with less delay (e.g., as a result of the reduced usage of resources), allowing for remediation actions (e.g., alerting security personnel, changing an aspect of a system to address the anomaly, etc.) to be performed quicker. Such reduction in time may allow for a reduced likelihood of a data breach, thereby protecting the security of resources, computing devices, and networking devices in the computing environment.

As such, example embodiments are described herein directed to techniques for adapting a spike detection algorithm. For instance, FIG. 1 shows a block diagram of a system 100 for detecting a spike in a computing environment, in accordance with an example embodiment. As shown in FIG. 1, system 100 includes a computing device 102, a computing device 108, and a computing device 114. Computing device 102 includes a resource access interface 104. Computing device 108 includes a spike detection system 110 and a set of resources 112. Computing device 114 includes a user interface (UI) 116. As shown in FIG. 1, UI 116 includes an alert 118. Computing device 102, computing device 108, and computing device 114 may be communicatively coupled by a network 106. An example computing device that may incorporate the functionality of computing device 102, computing device 108, and computing device 114 (or any subcomponents therein, whether or not illustrated in FIG. 1) is described below in reference to FIG. 7. It is noted that system 100 may comprise any number of devices, including those illustrated in FIG. 1 and optionally one or more further devices or components not expressly illustrated. System 100 is further described as follows.

Network 106 may include one or more of any of a local area network (LAN), a wide area network (WAN), a personal area network (PAN), a combination of communication networks, such as the Internet, and/or a virtual network. In example implementations, computing device 102, computing device 108, and computing device 114 communicate via network 106. In an implementation, any one or more of computing device 102, computing device 108, and computing device 114 over network 106 may communicate via one or more application programming interfaces (API) and/or according to other interfaces and/or techniques. Computing device 102, computing device 108, and computing device 114 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 102 includes any number of one or more computing devices of one or more users (e.g., individual users, family users, enterprise users, governmental users, etc.) that each comprise one or more applications, operating systems, virtual machines, storage devices, etc. that may be used to access and/or manage any of resources 112. Computing device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. Computing device 102 is not limited to a physical machine, but may include other types of machines or nodes, such as a virtual machine. Computing device 102 may interface with other components illustrated in FIG. 1 through APIs and/or by other mechanisms.

Resource access interface 104 may comprise any user interface through which access of resources 112 may be provided. Resource access interface 104 may comprise a web-based interface, an application, or any other type of interface for accessing and/or presenting information associated with resources 112. In examples, resource access interface 104 may comprise or utilize any one or more authentication features to authenticate a user of computing device 102, such as prompts for inputting identity information (e.g., username, password, or other credentials), biometric authentication features, access cards, or other features for authenticating a user. Resource access interface 104 may comprise any application in which information (e.g., resources 112) may be accessed via computing device 108 and presented in resource access interface 104 in any suitable fashion. For instance, information may be presented in textual form, graphs, charts, images, videos, or any other manner as will be appreciated to those skilled in the relevant arts.

Computing device 108 may comprise any one or more computing devices, servers, services, local processes, remote machines, web services, etc. for hosting, managing, and/or providing access to resources 112. For instance, computing device 108 may comprise a server coupled to an organization's network, a remotely located server, a cloud-based server (e.g., one or more servers in a distributed manner), or any other device or service that may host, manage, and/or provide access to resource 112. For instance, computing device 108 may comprise any system in which data transactions with respect to resources 112 are executed. Resources 112 comprise any type of data, software component, or hardware component of computer (or a combination thereof) that is accessed or utilized by one or more entities in a computing environment. In some examples, a resource is defined by a collection of information or data that is stored in a storage device (e.g., database data). In other examples, a resource includes one or more physical or virtual components of a computing device that may be utilized, in whole or in part, for processing information (e.g., a processor). In examples therefore, resources 112 include, but are not limited to, a computer or processor, a physical host, a virtual machine, software (e.g., software as a service (SaaS), a platform as a service (PaaS), etc.), licenses, devices (including network devices), a memory or storage (e.g., physical storage devices, local storage devices, cloud-based storages, disks, hard disk drives, solid state devices (SSDs), random access memory (RAM) devices, etc.), data stored within a storage (e.g., files, databases, etc.) or any other component or data of a computing environment that may be accessed or utilized by one or more entities.

In some instances, resources 112 includes data that is sensitive (e.g., confidential, critical, private, secure, and/or not otherwise intended for public dissemination), such as company records, personal information, educational information, health information, professional information, organizational or company information, banking or other financial records, legal documents, biographic information such as birth certificates, driver's licenses, passports, etc. These examples are illustratively only, and resources 112 may include any other type of data (including both confidential and non-confidential information) stored in any device whether locally and/or on a cloud-based storage. In some examples, resources 112 are stored in a secure manner, such as via password protection, encryption (e.g., public and private key encryption, symmetric keys, etc.), or any other secure manner as appreciated by those skilled in the relevant arts.

In implementations, resources 112 may include the resources for a particular organization (e.g., a company), a group or division (e.g., based on geography) of an organization, an individual, or any combination thereof. Further, in some implementations, resources 112 comprise resources belonging to a plurality of tenants (e.g., different clients or customers, such as different organizations) of a cloud services provider (or other storage provider) that provides storage resources for resources 112 and/or manages the security thereof. In one example, resources 112 comprise resources associated with (e.g., owned by) a plurality of unrelated or independent tenants, such as resources of companies lacking any meaningful business relationship with each other.

In examples, computing device 108 may comprise a device that is "on premises" of a customer. For instance, computing device 108 may comprise a computer or server that is physically located at or near a customer premises. Accordingly, processing, memory, and network resources associated with computing device 108 may be limited or constrained in examples, as will be described in greater below. However, it should be understood and appreciated that implementations are also contemplated where computing device 108 comprising a remotely located server or a collection of computing devices such as a network-accessible server (e.g., a cloud computing server network) that may comprise software or a service for managing access of resources 112.

Such a server may comprise a group or collection of servers (e.g., computing devices) that are each accessible by a network such as the Internet (e.g., in a "cloud-based" embodiment) and/or located remotely (e.g., in a different facility) from one or more of the devices shown in FIG. 1, and communicatively coupled thereto via network 106. Such a server, therefore, may comprise any number of computing devices, and may include any type and number of other resources, including resources that facilitate communications with and between servers, storage by the servers, etc. (e.g., network switches, storage devices, networks, etc.). In an embodiment, devices of servers may be co-located (e.g., housed in one or more nearby buildings with associated components such as backup power supplies, redundant data communications, environmental controls, etc.) to form a datacenter, or may be arranged in other manners. Accordingly, in an embodiment, servers described herein may be a datacenter in a distributed collection of datacenters.

Spike generation system 110 comprises any one or more algorithms executing within computing device 108 configured to detect anomalies with respect to any one or more accesses of resources 112. An anomaly comprises a data access that is potentially abnormal, such as a spike in an amount of data accessed by one or more entities (e.g., a user, a user account, a computing device, a group of entities, etc.). A spike can include, for instance, an access, or attempted access, of resources that has a value that is above or below a threshold (e.g., a baseline value based on observed or historical accesses for an entity). For example, a data access of resources 112 by a user account that obtains a volume of data (e.g., 100 megabytes) may be identified as a spike compared to a baseline volume of data (e.g., 1 megabyte) normally obtained by the user account. Such an example is intended to be illustrative only, and it should be appreciated to those skilled in the art that spike detection system 110 may comprise any one or more algorithms for detecting anomalies (e.g., spikes) in a computing environment with respect to resources 112.

As will be described in greater detail below, spike detection system 110 is configured to adapt one or more detection algorithms implemented therein based at least on constraint metrics of computing device 108 that spike detection system 110 executes within. For example, spike detection system 110 may comprise one or more components that adapts a spike detection algorithm to reduce the amount of processing, storage, or network resources (referred to herein as "computing resources") utilized during execution of the algorithm based on the availability of computing resources, which may result in a reduction in the time to detect an anomaly. In this manner, spike detection system 110 may optimize and execute one or more detection algorithms in a manner that efficiently utilizes the computing resources of computing device 108.

Computing device 114 includes any number of one or more computing devices of one or more users (e.g., individual users, family users, enterprise users, governmental users, etc.) that each comprise one or more applications, operating systems, virtual machines, storage devices, etc. that may be used to manage access of any of resources 112. Computing device 114 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. Computing device 114 is not limited to a physical machine, but may include other types of machines or nodes, such as a virtual machine. Computing device 114 may interface with other components illustrated in FIG. 1 through APIs and/or by other mechanisms. While computing device 114 and computing device 108 are illustrated as being separate, it is noted and understood that computing device 114 and computing device 108 (or any of the features described with respect to each of these components) may be combined together.

In examples, user interface 116 comprises an interface that includes one or more UI elements that, when selected, enable customization and/or management of one or more features of spike detection system 110 and/or policies (e.g., access policies, security policies, etc.) associated with the access of any of resources 112. For instance, UI 116 may comprise an interface that includes one or more interactive UI elements that enable the configuration (e.g., by a user and/or programmatically) of any aspect of the operation of spike detection system 110 as described herein. In implementations, UI 116 may be accessed via a web browser by navigation to a web page, via an application stored thereon, or other similar techniques. These examples are only illustrative, and it is understood that UI 116 may provide any type, number, and/or arrangement of elements to manage and/or customize the manner in which spike detection system 110 operates and/or the manner in which any of resources 112 are accessed.

As shown in FIG. 1, UI 116 may comprise an alert 118 therein. Alert 118 may include any type of information presented in UI 116 based at least on the operation of spike detection system 110. For instance, alert 118 may comprise a notification that an anomaly (e.g., a spike) has been detected in the computing environment with respect to a particular resource that may need to be reviewed and/or addressed by a user (e.g., an administrator, security personnel, the owner of the affected resource, etc.). In examples, alert 118 can include any information associated with the anomaly, such as an identification of the resource for which the anomaly was detected, a user account associated with the access, a type of access, an operation performed on the resource (e.g., downloaded, deleted, copied, moved, etc.), a timestamp associated with the access, a value associated with an amount of access (e.g., a volume or size of resources accessed), a query executed to access resources 112, a reason that the access was identified as an anomaly, or any other information related to the access of resources 112. In examples, alert 118 may be based on a detection algorithm detecting activity in a computing environment that indicates that a resource (e.g., database data or other data) was potentially stolen, data was backed up to another device or location that may be compromised, or any other activity that indicates that a resource is potentially compromised.

In other examples, alert 116 may include information associated with a spike detection algorithm, such as information relating to how spike detection system 110 adapted a spike detection algorithm based on a set of monitored constraints (e.g., an indication of an adapted set of metrics and/or baseline values), an indication of the monitored constraints during execution of a spike detection algorithm (adapted or adapted), a change (e.g. improvement) in the consumption of computing resources after adapting a spike detection algorithm, or other information associated with the operation of spike detection system 110 as described herein. While alert 118 is described here in as presented within UI 116, it is understood that alert 118 may be provided in any other manner, such as via email to one or more users, a text message, a chat message, a telephone call, etc.

In examples, alert 118 need not be present in the event of a spike detection. For instance, in some implementations, spike detection system 110 may automatically implement a remediation action configured to remediate, in whole or in part, a detected anomaly. Examples of such a remediation action include, but are not limited to, blocking access by a user account, blocking access to a resource, a change to a policy that identifies the set of users that are permitted to utilize a resource and/or conditions that are to be met in permitting access, an encryption change, etc.) in response to a detected spike. In some examples, a remediation action may be presented as a recommendation in UI 116, where the recommended remediation action may be implemented upon review and/or acceptance by a user.

It is noted that implementations are not limited to the illustrative arrangement shown in FIG. 1. For instance, computing device 102, computing device 108, and/or computing device 114 not be separate or located remote from each other. In some examples, any one or more of computing device 102, computing device 108, and/or computing device 114 (or any subcomponents therein) may be located in or accessible via the same computing device or distributed across a plurality of devices. For instance, techniques described herein may be implemented in a single computing device. Furthermore, it is understood that although resources 112 are shown as being implemented within computing device 108, resources 112 may be located in any other location, computing device (or collection of computing devices), and need not be co-located with or implemented in the same computing device as spike detection system 110. Furthermore, system 100 may comprise any number of storage devices, resources, networks, servers, and/or computing devices coupled in any manner.

Figure 2:
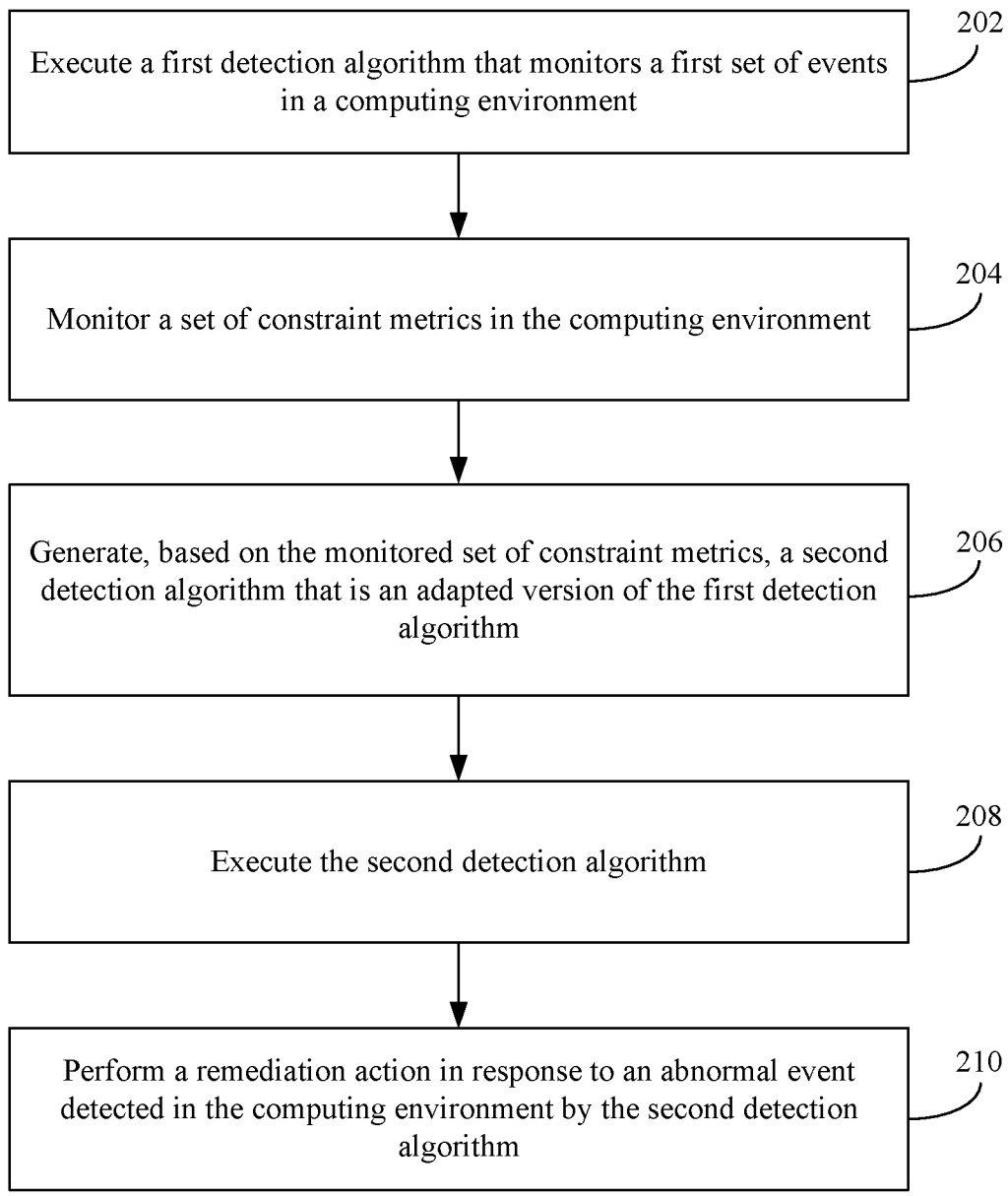
FIG. 2 shows a flowchart of a method for adapting a spike detection algorithm, in accordance with an example embodiment.

Spike detection system 110 may operate in various ways to detect a spike in a computing environment. For instance, spike detection system 110 may operate according to FIG. 2. FIG. 2 shows a flowchart 200 of a method for adapting a spike detection algorithm, in accordance with an example embodiment. For illustrative purposes, flowchart 200 and spike detection system 110 are described as follows with respect to FIG. 3. While example embodiments are described with respect to flowchart 200 and components of system 300, these examples are illustrative.

Figure 3:
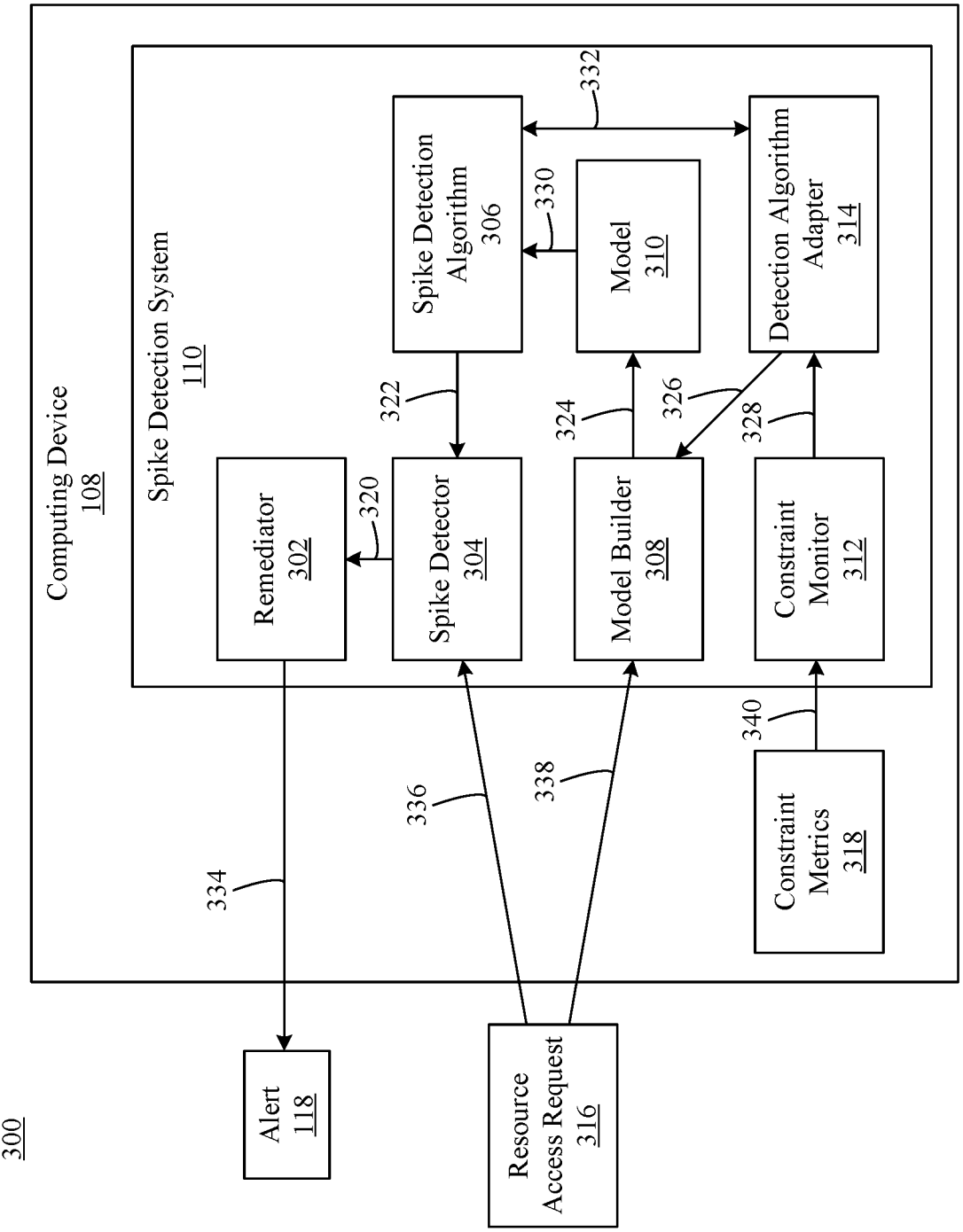
FIG. 3 shows a block diagram of a system for adapting a spike detection algorithm, in accordance with an example embodiment.

FIG. 3 shows a block diagram of a system for adapting a spike detection algorithm, in accordance with an example embodiment. As shown in FIG. 3, system 300 includes an example implementation of computing device 108, an example implementation of alert 118, and a resource access request 316. Computing device 108 includes an example implementation of spike detection system 110 and constraint metrics 318. Spike detection system 110 includes a remediator 302, a spike detector 304, a spike detection algorithm 306, a model builder 308, a model 310, a constraint monitor 312, and a detection algorithm adapter 314. Flowchart 200 and system 300 are described in further detail as follows.

Flowchart 200 begins with step 202. In step 202, a first detection algorithm is executed that monitors a first set of events in a computing environment. For instance, with reference to FIG. 3, spike detector 304 may be configured to execute 322 a detection algorithm, such as spike detection algorithm 306. Spike detection algorithm 306 may comprise a first spike detection algorithm (e.g., an initial version or iteration of a spike detection algorithm). In implementations, spike detector 304 may execute spike detection algorithm 306 to detect spikes in the computing environment based on receiving and/or intercepting resource access request 316. Resource access request 316 comprises any request to access resources 112, such as a query for data stored in a database system. It is noted that resource access request 316 is not limited to retrieval of resources, but includes any type of access whether or not data corresponding to the request is provided to a requesting computing device. Examples include, but are not limited to, requests to download, copy, move, modify, read, or delete a resource. Spike detection algorithm 306 may be stored in spike detection system 110 or may be accessible via network 106 (e.g., stored on the cloud). In implementations, spike detection algorithm 306 may be pre-loaded onto computing device 108. For instance, spike detection algorithm 306 may comprise one of several pre-configured algorithms, such as a first algorithm for lower computing resource usage, a second algorithm for medium computer resource usage, and a third algorithm for higher computer resource usage. In other examples, spike detection algorithm 306 may comprise a version of a spike detection algorithm that has been modified manually and/or in accordance with techniques described herein (e.g., a previously adapted version of a spike detection algorithm).

In examples, spike detection algorithm 306 may be configured to use model 310 in identifying events that are potentially anomalous. Model builder 308 may generate 324 model 310 based on resource access request 316, or a streaming set of resource access requests (e.g., a stream of queries). In some implementations, model builder 308 may continuously and/or periodically update model 310 based on receiving 338 each resource access request 316. For instance, model builder may update model 310 for each resource access 316 received in some implementations. In other implementations, model builder 308 may update model 310 periodically (e.g., after a threshold number of resource access requests are received, after a predetermined time period, etc.). Model 310 may be generated based on statistical information relating to observed (e.g., historical) data access requests by user accounts such that normal usage behaviors may be determined or predicted. As will be discussed below, model 310 may contain one or more sub-models therein (each having a different scope), such as a relationship model, a distance-based model, or any other type of model that may be used to identify usage patterns for different users, groups of users, or all users of a resource.

Model 310 may comprise any format or structure, such as a table or database, where each row identifies a different user account or broader grouping, and each column identifies a value associated with a different metric (e.g., relative, absolute, etc.). In accordance with techniques described herein, model 310 may be compressed or enlarged (e.g., by adding or removing rows and/or metrics) as determined by detection algorithm adapter 314 based on the observed constraint metrics. While model 310 is depicted as separate from spike detection algorithm 306 in FIG. 1, it should be understood that model 310 need not be separate from or external to spike detection algorithm 306. Rather, in some implementations, model 310 (or features therein) may be implemented as part of, or within, spike detection algorithm 306. In analyzing events in a computing environment, spike detection algorithm 306 may apply 330 model 310 to identify potentially anomalous events.

Spike detector 304 may execute spike detection algorithm 306 to monitor a first set of events in a computing environment (e.g., system 100 and/or system 300) and identify events in the first set of events that are anomalous. Each event may comprise an access (or attempted access) of data in the computing environment. Anomalous events include, but are not limited to, anomalies in the computing environment such as spikes or other potentially abnormal conditions relating to access of resources 112. An example of such a spike includes an amount of data accessed (e.g., an amount deleted, moved, copied, etc.) by a user account that exceeds one or more baseline (e.g., normal) values. Non-limiting examples of spike detection algorithms will be described in further detail below.

In step 204, a set of constraint metrics in the computing environment is monitored. For instance, with reference to FIG. 3, constraint monitor 312 may be configured to monitor 340 constraint metrics 318 in the computing environment. Constraint monitor 312 may monitor constraint metrics 318 before, during, and/or after execution of spike detection algorithm 306 described in step 202 (e.g., execution of a first version of the detection algorithm). In examples, constraint metrics 318 comprise a set of information indicative of an amount of computing resources of computing device 108 utilized by executing spike detection algorithm 306. Computing resources include, but are not limited to, processing resources, storage and/or memory resources, and network resources of computing device 108 (or any other computing device(s) on which spike detection system 110 operates). Such examples are only illustrative, and it is understood that the set of constraint metrics 318 monitored by constraint monitor 312 may include any other values that indicate a performance of computing device 108. In implementations, the set of constraint metrics may include a single monitored metric, or a collection of different monitored metrics.

For instance, upon execution of spike detection algorithm 306 by spike detector 304, computing resources of computing device 108 are utilized. In some examples, computing resources may be over-utilized in a manner that negatively impacts an overall performance of computing device 108 that can result in delays in executing resource access requests, delays in detecting spikes in the computing environment, a lack of usable memory, or any other impacts from an over-utilization of computing resources. Constraint monitor 312 may monitor the utilization of such resources and store the set of monitored resources as constraint metrics 318.

In step 206, a second detection algorithm is generated based on the monitored constraint metrics, where the second detection algorithm is an adapted version of the first detection algorithm. For instance, with reference to FIG. 3, detection algorithm adapter 314 may be configured to generate a second spike detection algorithm (e.g., spike detection algorithm 306 that is an adapted version of the first detection algorithm) based on receiving 328 constraint metrics 318 from constraint monitor 312. While FIG. 3 depicts a single spike detection algorithm, it is noted that spike detection algorithm 306 may comprise one or more spike detection algorithms, or may comprise an adapted version of a prior iteration of a spike detection algorithm. Accordingly, spike detector 304 may be configured to execute a first version of a spike detection algorithm, a second version of the spike detection algorithm adapted by detection algorithm adapter 314, a third version of the spike detection algorithm adapted by detection algorithm adapter 314, and so on.

In some implementations, detection algorithm adapter 314 may transmit 326 information to cause model builder 308 to update and/or rebuild model 310 based on the monitored constraints. For instance, model builder 308 may regenerate model 310 that is a simplified version of a previously generated model where certain usage patterns are removed from or otherwise no longer used in the model. In this manner, a second version of spike detection algorithm 306 may use a revised version of model 310 that operates with reduced processing and/or memory resources. The second detection algorithm may be configured to monitor a second set of events in the computing environment (e.g., system 100 and/or system 300). While the terms a "first set of events" and a "second set of events" are used herein to describe events in the computing environment, these terms are not intended to be limited to any particular set, collection, or type of events observed or monitored in the computing environment. Rather, a set of events may refer to the events that are monitored in the computing environment during or upon execution of a detection algorithm.

Detection algorithm adapter 314 may generate 332 the second spike detection algorithm such that execution thereof by spike detector 304 is predicted to result in a reduction of the amount of computing resources utilized. For example, the second spike detection algorithm may be modified in a manner such that execution thereof uses less processing resources, memory or storage resources, and/or less networking resources of computing device 108. For instance, the second spike detection algorithm may be a simplified or streamlined version of an initial spike detection algorithm that stores less information and/or uses less calculations in identifying potential spikes.

In other examples, the second spike detection algorithm may be modified in such a manner as to use more of such resources where available. For instance, detection algorithm adapter 314 may regenerate model 310 and/or spike detection algorithm 306 that includes one or more additional features, usage patterns, metrics, etc., such that a second version of the spike detection algorithm may detect potentially anomalous events in the computing environment with improved accuracy. Such a scenario may be desired where constraint metrics 318 indicate that the computing resources of the computing environment in which spike detection algorithm 306 are not over-utilized and additional resources may be used for detection of anomalous events.

In this manner, detection algorithm adapter 314 may generate the second spike detection algorithm that is optimized for computing device 108 or any other environment in which spike detection system 110 executes (e.g., by reducing an amount of utilized resources and/or enhancing an accuracy of detecting anomalous events). Further examples regarding the operation of detection algorithm adapter 314 will be described in greater detail below.

In step 208, the second spike detection algorithm is executed. For instance, with reference to FIG. 3, spike detector 304 may be configured to execute 322 a second spike detection algorithm (e.g., spike detection algorithm 306 that is an adapted version of a previous or initial version). Execution of the second spike detection algorithm to monitor a second set of events in the computing environment may be performed in a similar manner as described above with respect to execution of the first spike detection algorithm to monitor a first set of events in the computing environment. For instance, the second set of events may include receiving 336 each resource access request made in the computing environment during execution of the second, or adapted, spike detection algorithm.

In step 210, a remediation action is performed in response to an abnormal event detected in the computing environment by the second detection algorithm. For instance, with reference to FIG. 3, remediator 302 may be configured to perform a remediation action in response receiving 320 an indication of an abnormal event detected in the computing environment by the second detection algorithm. A remediation action as described herein includes any action that is intended to prevent or mitigate a potential incident (e.g., breach) resulting from the abnormal event. In one implementation, a remediation action can include generation and/or transmission 334 of alert 118 to an appropriate user (e.g., security personnel, administrator, resource owner, etc.) or user's device, such as a text message, an email message, a chat message, a telephone call, or any other type of notification. In some instances, alert 118 may comprise a notification sent to an incident management system such that alert 118 may be included in a security incident generated in the incident management system. Such an alert 118 may include any information associated with the alert, such as a time, a user account from which access or attempted access was made, an identification of the resources accessed or attempted to be accessed, a score or level indicative of a confidence that the alert relates to a malicious activity, etc.

In other examples, a remediation action can include an automatic and/or semi-automatic implementation of a change to the manner in which resources 112 may be accessed, such as altering permissions of one or more users, blocking an activity on a resource, blocking a user, implementing policy changes, recommending a policy change or other preventative measure (e.g., changing a password, adopting or changing an encryption measure, etc.), or any other change as described herein and/or appreciated to those skilled in the arts. These examples are only illustrative, and it is understood that other appropriate remediation actions may also be generated, provided and/or implemented as appreciated by those skilled in the relevant arts.

Further, while example embodiments are described for detecting a spike in a computing environment, it should be understood that disclosed techniques are not limited only to spike detection. Rather, disclosed techniques may apply to other types of detection algorithms intended to detect potential anomalies in computing environments.

Figure 4:
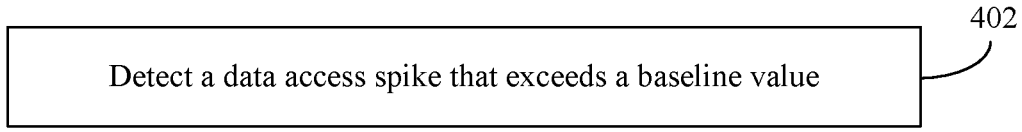
FIG. 4 shows a flowchart of a method for detecting a data access spike, in accordance with an example embodiment.

As described above, spike detector 304 may identify potential anomalies in a computing environment. For example, FIG. 4 shows a flowchart 400 of a method for detecting a data access spike, in accordance with an example embodiment. In an implementation, the method of flowchart 400 may be implemented by spike detector 304. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, a data access spike that exceeds a baseline value is detected. For instance, with reference to FIG. 3, spike detector 304 may be configured to detect a spike in a data access (or multiple data accesses) that exceeds a baseline value. Spike detector 304, by executing spike detection algorithm 306, may be configured to monitor any variable associated with a data access for which an alert may be generated, such as an amount of data extracted, downloaded, copied, moved, deleted, etc. The amount may be a size of a file, an aggregated size of a plurality of files, a number of files, a frequency of access (e.g., a number of accesses in a period of time) associated with a data access. In other examples, the monitored variable may be a type of resource accessed (e.g., accessed resources are stored or categorized in a location that is not typically accessed by a user account), resources belonging to different user groups, file types accessed, etc.

Spike detector 304, by executing spike detection algorithm 306, may compare the one or more monitored variables to one or more baseline values, where each baseline value identifies an expected value for the variable for a user account (or a group of user accounts). The expected value may comprise, for instance, an amount of data normally extracted for a user account or group of user accounts (e.g., a number of rows of a database typically accessed by the user account) based on historical data accesses of the user or group of users. Where the monitored variable exceeds the baseline value with respect to one or more monitored variables, spike detector 304 may be configured to detect a data access spike (e.g., a user account downloads 100 megabytes of data, while the baseline value is 1 megabyte for the user account based on historical data).

In examples, spike detector 304 may compare a value associated with a particular data access with a baseline value corresponding to the user account, a grouping of user accounts (e.g., a team) to which the user account belongs, or all user accounts of the database. If the value associated with the data access spike exceeds any one of the baselines (or combinations thereof), spike detector 304 may determine that the data access is a spike and therefore potentially anomalous.

In further examples, spike detector 304 may be configured to detect data access spikes based at least on various types of information stored in model 310 and/or metrics. For instance, spike detector 304 may identify data spikes by applying any combination of a probability model (e.g., a relative model), a distance model (e.g., an absolute model), or a model/metric that is based on different roles and/or levels associated with user accounts. Additional details are provided herein with respect to spike detection algorithm 306 being adapted in a manner that implements appropriate models and/or metrics based on monitored constraint metrics 318.

Figure 5:
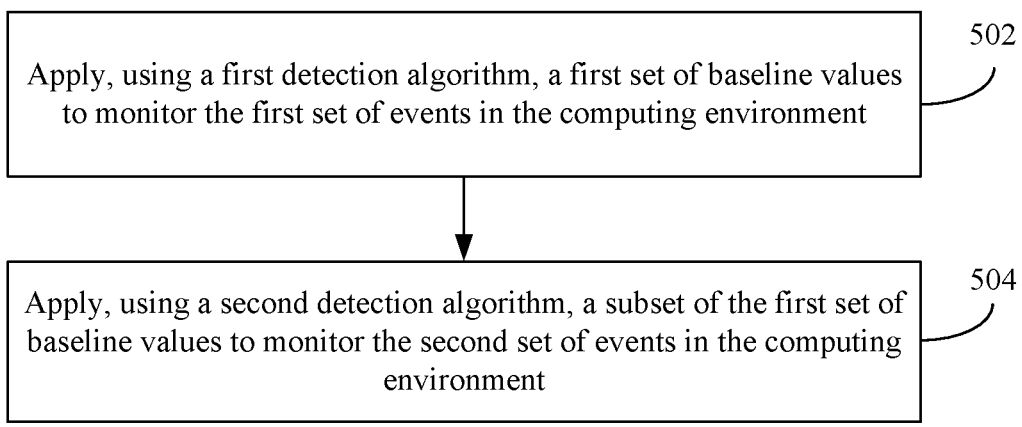
FIG. 5 shows a flowchart of a method for applying a subset of values to monitor events in a computing environment, in accordance with an example embodiment.

As described above, detection algorithm adapter 314 may adapt a spike detection algorithm in various ways. For example, FIG. 5 shows a flowchart 500 of a method for applying a subset of values to monitor events in a computing environment, in accordance with an example embodiment. In an implementation, the method of flowchart 500 may be implemented by spike detector 304, spike detection algorithm 306, and/or detection algorithm adapter 314. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a first set of baseline values is applied to monitor a first set of events in a computing environment. For instance, with reference to FIG. 3, a first version of spike detection algorithm 306 may be configured to apply a first set of baseline values to monitor the first set of events in the computing environment (e.g., system 100 and/or system 300). The first set of baseline values may comprise, for instance, a plurality of baseline values, each of which is associated with a respective user account (also referred to herein as principals). For instance, each individual user account may comprise a profile individualized based on a prior access history by that user account. The first set of baseline values may also include one or more baseline values associated with a broader grouping of user accounts, such as user roles or levels and/or an application-level baseline value that comprises a baseline value for all principals that are permitted to access resources associated with the application (e.g., a database-level baseline that applies to all user accounts with access to the database). For example, such user role, user level, and/or application-level baselines may each comprise a profile with respective baseline value(s). In implementations, baseline values assigned to a broader grouping may be generated based on an aggregation or average of individual principal baseline values that belong to each broader grouping. Furthermore, each profile described herein may contain any number of values, such as baseline and/or threshold values used for relative and absolute deviations as described in greater detail below.

In the above manner, when a data access is analyzed by spike detector 304, values associated with the data access (e.g., an amount of data downloaded) may be compared with the baseline value of a user account or principal that accessed the data and the baseline value of a broader grouping that includes the user account. This is only an illustrative example, and it should be noted that the first set of baseline values may include any set of values as described herein for which comparisons may be made with respect to a given data access.

In step 504, a subset of the first set of baseline values is applied to monitor the second set of events in the computing environment. For instance, with reference to FIG. 3, a second version of spike detection algorithm 306 (e.g., an adapted version as described herein) may be configured to apply a subset of the first set of baseline values applied by first detection algorithm to monitor the second set of events in the computing environment. In other words, the second, or adapted, detection algorithm may apply a set of baseline values that is less than an initial set such that analyzing a data access may be performed with reduced computing resources. The subset of baseline values may comprise, for instance, only the baseline values of groupings of user accounts (whereas the first set may include baseline values for groupings of user accounts and individual user accounts). While this is only an illustrative example, it should be understood that detection algorithm adapter 314 may generate an adapted spike detection algorithm that is configured to apply any subset of baseline values compared to an initial set baseline values.

In some other examples, if monitored constraint metrics indicate that resource consumption is still too excessive, detection algorithm adapter may be configured to further adapt a spike detection algorithm to avoid detection of spikes based on a distance metric (e.g., as discussed above with respect to deviations from a baseline value) altogether, and instead utilize one or more other metrics that have a further reduction in consumed resources. Such adaptions may be performed any number of times until a balance is achieved between consumed computing resources and an accuracy of spike detection in the computing environment.

It should also be noted that while these illustrations describe a second detection algorithm that applies a subset of (e.g., less than) the first set of baseline values based on monitored constraint metrics, disclosed techniques may also comprise adapting the second detection algorithm such that it is configured to apply a set of baseline values greater than the first set (e.g., where the monitored constraint metrics indicate that computing resources are not over-utilized in the computing environment).

Figure 6:
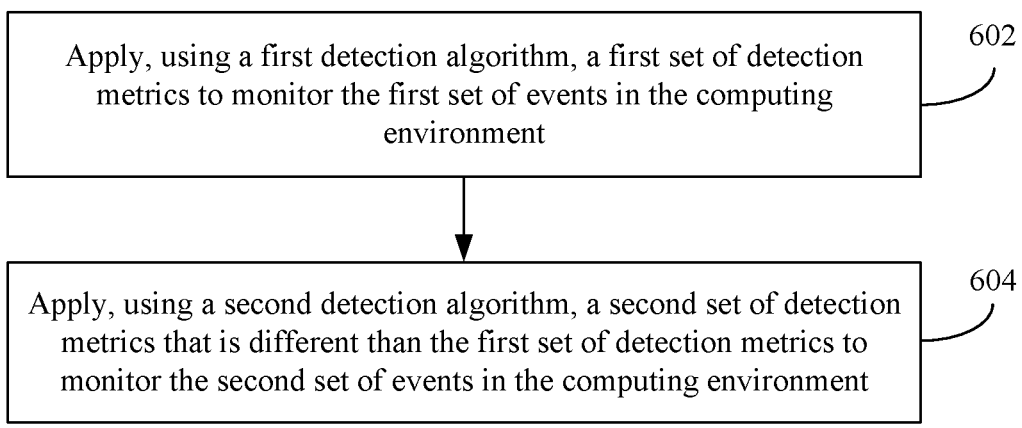
FIG. 6 shows a flowchart of a method for applying an adapted set of metrics to monitor events in a computing environment, in accordance with an example embodiment.

Detection algorithm adapter 314 may adapt a spike detection algorithm in other ways. For example, FIG. 6 shows a flowchart 600 of a method for applying an adapted set of metrics to monitor events in a computing environment, in accordance with an example embodiment. In an implementation, the method of flowchart 600 may be implemented by spike detector 304, spike detection algorithm 306, and/or detection algorithm adapter 314. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, a first set of detection metrics is applied to monitor the first set of events in the computing environment. For instance, with reference to FIG. 3, a first version of spike detection algorithm 306 may be configured to apply a first set of detection metrics to monitor the first set of events in the computing environment (e.g., system 100 and/or system 300). The first set of detection metrics may include, for instance, any one or more criteria that may be used to determine whether a given data access should be identified as a spike. Examples of such metrics include, but are not limited to, a metric that identifies an anomaly level of a data access, a metric that identifies a significance level of the data access, and a metric that identifies an interest level of the data access. Further details regarding these example metrics are described in greater detail herein. It is noted that these metrics are only illustrative, and other metrics are also contemplated herein that may be included in a set of metrics used to determine whether a data access is anomalous.

In step 604, a second set of detection metrics that is different than the first set of detection metrics is applied to monitor the second set of events in the computing environment. For instance, a second version of spike detection algorithm 306 may apply a set of detection metrics that is different than the first set of detection metrics to monitor events in the computing environment. The second set of detection metrics may include less than (e.g., a subset of) the first set of metrics, such as to reduce the consumption of computing resources, or may include more than the first set of metrics, such as to increase the accuracy in which spike detection is performed in the computing environment. As described herein, detection algorithm adapter 314 may be configured to adapt spike algorithm 306 based on the monitored constraint metrics 318 in the computing environment (e.g., by altering the set of metrics used for spike detection) such that utilization of computing resources may be optimized.

III. Further Description of and Additional Spike Detection Embodiments

The following sections are intended to further describe the above example embodiments and describe additional example embodiments in which implementations may be provided. Furthermore, the sections that follow explain additional context for such example embodiments and details relating to the implementations. The sections that follow are intended to illustrate various aspects and/or benefits that may be achieved based on techniques described herein, and are not intended to be limiting. Accordingly, while additional example embodiments are described, it is understood that the features described below are not required in all implementations.

In example spike detection embodiments, techniques may be implemented by or in one or more of computing device 102, resource access interface 104, computing device 108, spike detection system 110, resources 112, computing device 114, UI 116, alert 118, remediator 302, spike detector 304, spike detection algorithm 306, model builder 308, model 310, constraint monitor 312, detection algorithm adapter 314, resource access request 316, constraint metrics 318, and/or in connection with any steps of flowcharts 200, 400, 500, and/or 600. Other structural and operational implementations will be apparent to persons skilled in the relevant art(s) based on the following discussion.

Techniques are disclosed herein for a detection framework for detecting numerous spikes which can be used to detect anomalous data exfiltration and addresses problems with certain conventional solutions.

Adaptable complexity-accuracy balance. In implementations, constraints may be present in a computing environment in which a detection algorithm is executing, as described above. For instance, constraints monitor 312 may monitor constraint metrics 318 as described herein, which may relate to constraints that are dynamic, dependent on a number of entities, available CPU resources, etc. In examples, a framework is disclosed in which an appropriate (e.g., optimal) balance is determined between complexity of the detection algorithm and an accuracy of the detection algorithm. In other words, techniques described herein allow for adapting a detection algorithm (e.g., spike detection algorithm 306) in a manner such that the detection algorithm is accurate on one hand, and cheap on the other hand from a computing resource standpoint (e.g., consumes a reduced amount of computing resources). Such balancing may be performed automatically and/or manually in implementations.

Streaming mode. Since an IDS also typically has a memory constraint (e.g., computing device 108 may have a limited number of memory resources) and the model may not be scaled for some scenarios, information about each resource access request (e.g., query that is executed) may not be saved individually. In such instances, relevant information for each data access request is streamed (e.g., query by query), and the state of each environment and/or scope is updated iteratively. The relevant information for each data access request can include, for instance, a user account, a group associated with the user account, an amount of data accessed, a number of rows of a database extracted, a type of access or operation, or any other information associated with the access of data. Model builder 308 may be configured to stream information for each resource access request 316 as they arrive and iteratively update information in model 310 as described herein. State information (or any other information described herein) in model 310 may then be used by spike detector 304 and/or spike detection algorithm 308 to analyze a new resource access request (e.g., query) that arrives to determine whether the new resource access request is an anomaly (e.g., a spike). An additional advance of this mode is improvements to the TTD to real-time or almost near time. For instance, even if a computing device is powerful and is not severely constrained by any computing resources (such as where spike detection system 110 is implemented on a server or a powerful computing device), detection algorithm adapter 314 may be configured to adapt spike detection algorithm 306 as described herein to reduce a TTD metric.

Combined logic using absolute and relative anomaly scores. In some implementations where external tools were not suitable (e.g., due to one or more of the constraints described herein), and in order to maintain a sufficiently high level of accuracy, spike detector 304 may be configured to utilize a plurality of methods for identifying anomalies. For instance, spike detector 304 may detect an anomaly based on a relative deviation (e.g., a zScore, based on moments as described below), or based on an absolute deviation (e.g., a qScore, based on quantiles, as described below). In examples, a threshold for each metric and/or the manner in which an anomaly signal is generated may be changed (e.g., automatically or manually).

Implementation on a SQL Virtual Machine (VM). In some examples, spike detector 304 may use information received from an SQL Server (e.g., executing on computing device 108 or another computing device) for running a spike detection in two levels: a database level and a principal level (e.g., individualized for each principal, or user account). Spike detection at the database level may take into account all users of the database. Spike detection at the principal level may take into account the previously observed behaviors of a particular principal (e.g., user) of the database. As the number of databases and principals on a single SQL Server instance (which may also be referred to as a single SQL VM) may not be controlled in some instances, spike detector 304 may be configured to limit its memory usage during operation. When the memory usage exceeds a certain (e.g., dynamic) limit, detection algorithm adapter 314 may be configured to stop storing or logging the data of individual principals (which may degrade overall performance), and instead may cause spike detector 304 to perform detections at the database level (or any other level or grouping above the principal level, if not at the database level). Furthermore, with respect to some SQL server implementations, certain other higher-level user characteristics (e.g., roles) may be utilized to build models for families of users sharing similar characteristics.

Example implementations. Techniques described herein relate to implementing an effective and/or transparent spike detector under changing (potentially severe changes) memory, computation, and availability constraints. Accordingly, example embodiments provide for a flexible detection framework that is adaptable to various constraints, not dependent on external tools, lightweight, and accurate. In some implementations, minimal logic may be initially provided, and more complex (and more accurate) calculations may be implemented if possible under specific environmental constraints. In other examples, complex algorithms may be initially provided, and simpler logic may be implemented based on the monitored constraints (e.g., to reduce memory usage where an observed memory constraint is too severe).

In examples, to preserve high accuracy of detected cases, high numerical outliers are detected that trigger alerts based on any one or more criteria. In some implementations, alerts may be based on any combination of three criteria: anomaly, significance, and interest. However, it is understood that not all of these criteria will be required in all implementations (e.g., the set of criteria selected may be based on observed constraint metrics in accordance with disclosed techniques to reduce utilization of computing resources), and implementations may utilize any one or more additional criteria not described herein.

Under the anomaly criteria (e.g., using a probability model), a high data point (e.g., a spike) may be considered anomalous if the probability to exceed it is below threshold E:

$$P(X > x) = 1 - F_x(x) < \varepsilon$$

For instance, a probability is calculated that an amount of extraction is higher than a threshold. In an example, it may be determined that any data extraction that exceeds a threshold value of 300 rows of data (which may be significantly larger than a baseline value) is anomalous. If a data extraction is identified that exceeds this value, spike detector 304 may determine that the data extraction is potentially anomalous.

In one implementation, a high data point may be considered anomalous based on a modified Thompson metric. For datapoint x, a zScore is calculated based on a sample mean and standard deviation:

$$Z_x = \frac{x_i - \bar{x}}{sd(x)}$$

This gives a number of standard deviations x that are above the mean, bounded by Chebyshev's inequality:

$$P(Z_x > k) \le \frac{1}{k^2}$$

In a further implementation, a time series analysis can be used, by decomposing the signal to seasonality, trend and noise components, and detecting spikes as datapoints with high prediction error metrics (such as using a Symmetric Mean Absolute Percentage Error Technique, or SMAPE) over a stable series.

Under the significance criteria (e.g., using a distance model), a high data point (e.g., a spike) may be identified as significant if its absolute distance from stable boundaries of the expected values (e.g., baseline values) is not only statistically anomalous, but also big enough. For example, for stable distribution with big signal-to-noise ratio $$\frac{\bar{x}}{sd(x)},$$

even a small deviation may be anomalous but not significant. In one implementation, a modified Tuckey metric may be used (e.g., based on percentiles or quantiles, such 99th and 75th quantiles), and a qScore may be calculated as follows:

$$Q_x = \frac{x_i - Q_{99}}{q_{99} - q_{75}}$$

In further implementations, clustering approaches can be also implemented where spikes are defined as data points which are distant from respective cluster centroids.

Under the interest criteria, a high data point (e.g., a spike) may be identified as interesting if it potentially has intrinsic interest. For example, an extraction of 5 megabytes of data may be less interesting (even if identified as a high data point under the anomaly or significance metric) than an extraction of 500 gigabytes of data. In one implementation, a static minimal threshold for potential high value outliers is used.

In another implementation, dynamic thresholds may be used based on tags such as data classification (e.g., using lower thresholds for sensitive data), user reputation, etc.

Each of these calculations can be made either using math operations, available statistical functions (e.g., percentiles, standard deviation) or more advanced frameworks (e.g., time series decomposition). As a proof of concept under a severe set of constraints, a version of the framework was validated which can be implemented using one or more of the operations described herein. In examples, moments may be calculated from a sum of variables and their squares, and quantiles may be approximated using a binning approach.

In addition, the model can be built either for high-level resources (e.g., database or table), or multiple granularities (e.g., usage pattern for each individual user or application). Determining of which model to use can be done automatically using rules (e.g., different implementation for storage/CPU levels), dynamically (e.g., keeping runtime under reasonable limits), or manually (a user or administrator can decide on a complexity/accuracy ratio that is suitable or optimal a particular environment). For instance, adaptations to a detection algorithm may be based, at least in part, on user-inputted constraints (e.g., limits on computing resources that should be utilized by the spike detector, such as an amount or percentage of CPU available for use by the detector). In other examples, a user input may include designations of different sets of constraints or other inputs for different buckets of data, such as by specifying a higher processing limit for sensitive data and a lower processing limit for data that is not sensitive. These examples are only illustrative, and it should be appreciated that any features described herein may be optimized or configured by a user (e.g., via UI 116) and/or automatically.

An additional advantage of the disclosed implementations is that any one or more of the state calculations described above may be performed for predefined periods of time (e.g., weeks), and a final state may be aggregated from these intermittent states. This allows improvements in accuracy by giving more weight to recent periods (thus favoring fresh events over stale ones) while complying to data management policies (such as General Data Protection Regulation, or GDPR) which limit allowable retention.

IV. Example Computer System Implementation

Computing device 102, resource access interface 104, computing device 108, spike detection system 110, resources 112, computing device 114, user interface 116, alert 118, remediator 302, spike detector 304, spike detection algorithm 306, model builder 308, model 310, constraint monitor 312, detection algorithm adapter 314, resource access request 316, constraint metrics 318, flowchart 200, flowchart 400, flowchart 500, and/or flowchart 600 may be implemented in hardware, or hardware combined with one or both of software and/or firmware. For example, computing device 102, resource access interface 104, computing device 108, spike detection system 110, resources 112, computing device 114, user interface 116, alert 118, remediator 302, spike detector 304, spike detection algorithm 306, model builder 308, model 310, constraint monitor 312, detection algorithm adapter 314, resource access request 316, constraint metrics 318, flowchart 200, flowchart 400, flowchart 500, and/or flowchart 600 may be implemented as computer program code/instructions configured to be executed in one or more processors and stored in a computer readable storage medium.

Alternatively, computing device 102, resource access interface 104, computing device 108, spike detection system 110, resources 112, computing device 114, user interface 116, alert 118, remediator 302, spike detector 304, spike detection algorithm 306, model builder 308, model 310, constraint monitor 312, detection algorithm adapter 314, resource access request 316, constraint metrics 318, flowchart 200, flowchart 400, flowchart 500, and/or flowchart 600 may be implemented as hardware logic/electrical circuitry.

For instance, in an embodiment, one or more, in any combination, of computing device 102, resource access interface 104, computing device 108, spike detection system 110, resources 112, computing device 114, user interface 116, alert 118, remediator 302, spike detector 304, spike detection algorithm 306, model builder 308, model 310, constraint monitor 312, detection algorithm adapter 314, resource access request 316, constraint metrics 318, flowchart 200, flowchart 400, flowchart 500, and/or flowchart 600 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
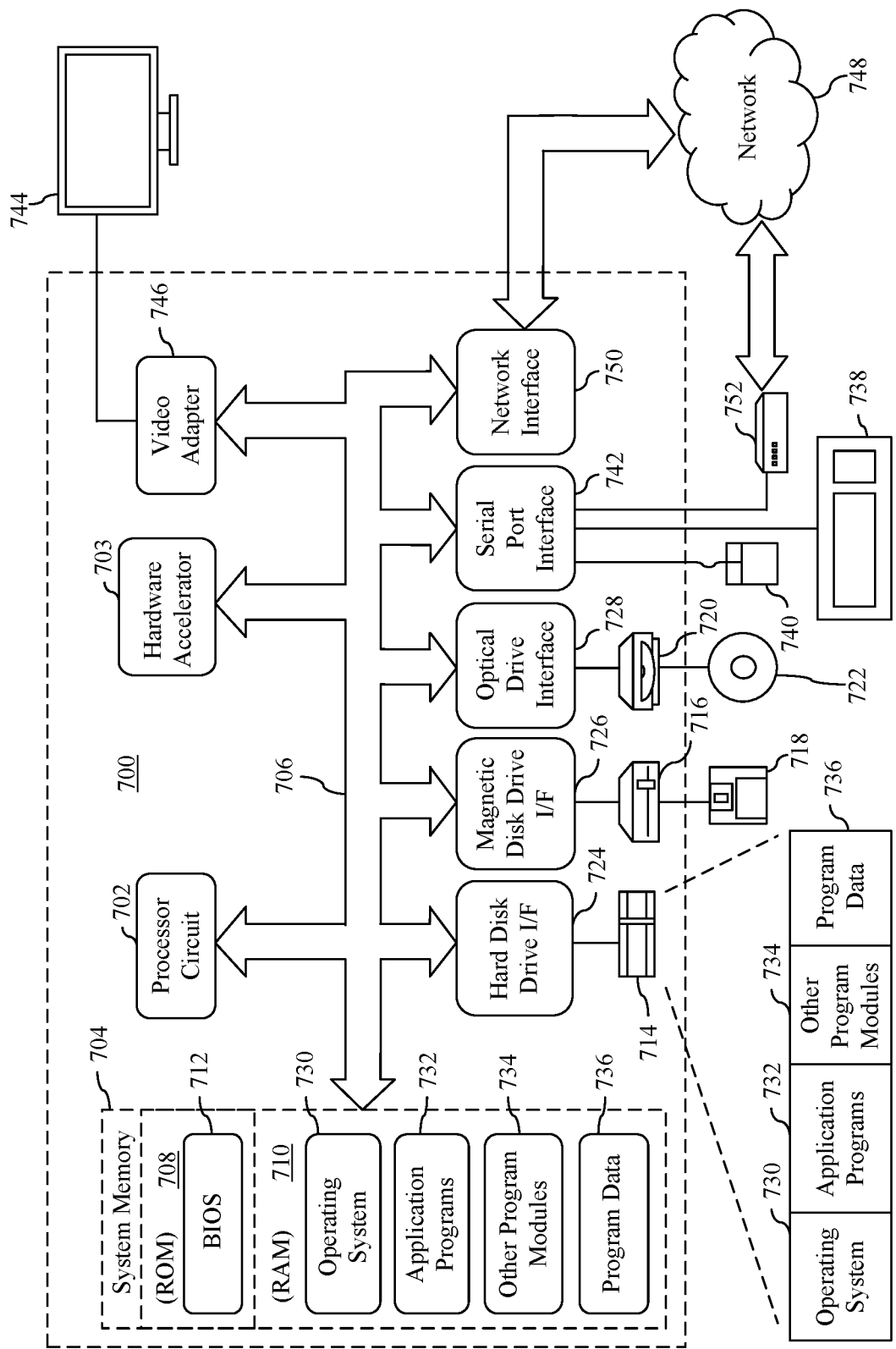
FIG. 7 is a block diagram of an example processor-based computer system that may be used to implement various embodiments.

FIG. 7 depicts an exemplary implementation of a computing device 700 in which embodiments may be implemented. For example, computing device 102, resource access interface 104, computing device 108, spike detection system 110, resources 112, computing device 114, user interface 116, alert 118, remediator 302, spike detector 304, spike detection algorithm 306, model builder 308, model 310, constraint monitor 312, detection algorithm adapter 314, resource access request 316, constraint metrics 318, flowchart 200, flowchart 400, flowchart 500, and/or flowchart 600 (and/or any of the steps of flowcharts 200, 400, 500, and/or 600 described therein) may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a hardware accelerator 703, a system memory 704, and a bus 706 that couples various system components including system memory 704 to processor circuit 702 and hardware accelerator 703. Processor circuit 702 and/or hardware accelerator 703 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing any of the features of computing device 102, resource access interface 104, computing device 108, spike detection system 110, resources 112, computing device 114, user interface 116, alert 118, remediator 302, spike detector 304, spike detection algorithm 306, model builder 308, model 310, constraint monitor 312, detection algorithm adapter 314, resource access request 316, constraint metrics 318, flowchart 200, flowchart 400, flowchart 500, flowchart 600, and/or further embodiments described herein.

A user may enter commands and information into computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

A system for adapting a detection algorithm is disclosed herein. The system comprises: at least one processor circuit; and at least one memory that stores program code configured to be executed by the at least one processor circuit, the program code comprising: a detector configured to execute a first detection algorithm that monitors a first set of events in a computing environment; a constraint monitor configured to monitor a set of constraint metrics in the computing environment; a detection algorithm adapter configured to generate, based on the monitored set of constraint metrics, a second detection algorithm that is an adapted version of the first detection algorithm, the second detection algorithm configured to monitor a second set of events in the computing environment, wherein the detector is configured to execute the second detection algorithm; and a remediator configured to perform a remediation action in response to an abnormal event detected in the computing environment by the second detection algorithm.

In one implementation of the foregoing system, the set of constraint metrics includes at least one parameter associated with the usage of a processor, memory, or a network of the computing device.

In another implementation of the foregoing system, the second detection algorithm is a spike detection algorithm configured to detect a data access spike that exceeds a baseline value.

In another implementation of the foregoing system, the computing environment comprises a database.

In another implementation of the foregoing system, the first detection algorithm is configured to apply a first set of baseline values to monitor the first set of events in the computing environment, and the second detection algorithm is configured to apply a subset of the first set of baseline values to monitor the second set of events in the computing environment.

In another implementation of the foregoing system, the first set of baseline values includes a plurality of baseline values associated with each of a plurality of principals, and an application-level baseline value.

In another implementation of the foregoing system, the first detection algorithm is configured to apply a first set of detection metrics to monitor the first set of events in the computing environment, and the second detection algorithm is configured to apply a second set of detection metrics that is different than the first set of detection metrics to monitor the second set of events in the computing environment.

In another implementation of the foregoing system, the first set of detection metrics includes a first metric that identifies an anomaly level of a data access, a second metric that identifies a significance level of the data access, and a third metric that identifies an interest level of the data access.

A method for adapting a detection algorithm is disclosed herein. The method comprises: executing a first detection algorithm that monitors a first set of events in a computing environment; monitoring a set of constraint metrics in the computing environment; generating, based on the monitored set of constraint metrics, a second detection algorithm that is an adapted version of the first detection algorithm, the second detection algorithm configured to monitor a second set of events in the computing environment; executing the second detection algorithm; and performing a remediation action in response to an abnormal event detected in the computing environment by the second detection algorithm.

In one implementation of the foregoing method, the set of constraint metrics includes at least one parameter associated with the usage of a processor, memory, or a network of the computing device.

In another implementation of the foregoing method, second detection algorithm is a spike detection algorithm configured to detect a data access spike that exceeds a baseline value.

In another implementation of the foregoing method, the computing environment comprises a database.

In another implementation of the foregoing method, the first detection algorithm is configured to apply a first set of baseline values to monitor the first set of events in the computing environment, and the second detection algorithm is configured to apply a subset of the first set of baseline values to monitor the second set of events in the computing environment.

In another implementation of the foregoing method, the first set of baseline values includes a plurality of baseline values associated with each of a plurality of principals, and an application-level baseline value.

In another implementation of the foregoing method, the first detection algorithm is configured to apply a first set of detection metrics to monitor the first set of events in the computing environment, and the second detection algorithm is configured to apply a second set of detection metrics that is different than the first set of detection metrics to monitor the second set of events in the computing environment.

In another implementation of the foregoing method, the first set of detection metrics includes a first metric that identifies an anomaly level of a data access, a second metric that identifies a significance level of the data access, and a third metric that identifies an interest level of the data access.

A computer-readable storage medium is disclosed herein. The computer-readable storage medium has program instructions recorded thereon that, when executed by at least one processor of a computing device, perform a method, the method comprising: executing a first detection algorithm that monitors a first set of events in a computing environment; monitoring a set of constraint metrics in the computing environment; generating, based on the monitored set of constraint metrics, a second detection algorithm that is an adapted version of the first detection algorithm, the second detection algorithm configured to monitor a second set of events in the computing environment; executing the second detection algorithm; and performing a remediation action in response to an abnormal event detected in the computing environment by the second detection algorithm.

In one implementation of the foregoing computer-readable storage medium, the set of constraint metrics includes at least one parameter associated with the usage of a processor, memory, or a network of the computing device.

In another implementation of the foregoing computer-readable storage medium, the second detection algorithm is a spike detection algorithm configured to detect a data access spike that exceeds a baseline value.

In another implementation of the foregoing computer-readable storage medium, the first detection algorithm is configured to apply a first set of baseline values to monitor the first set of events in the computing environment, and the second detection algorithm is configured to apply a subset of the first set of baseline values to monitor the second set of events in the computing environment.

VI. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system for adapting a detection algorithm, the system comprising:
    at least one processor circuit; and
    at least one memory that stores program code configured to be executed by the at least one processor circuit, the program code comprising:
        a detector configured to execute a first detection algorithm that monitors a first set of events in a computing environment and applies a first baseline value associated with a particular user account to the first set of events;
        a constraint monitor configured to monitor a set of constraint metrics in the computing environment, the constraint metrics indicative of an amount of computing resources utilized by the first detection algorithm;
        a detection algorithm adapter configured to regenerate the first detection algorithm based on the monitored set of constraint metrics to generate a second detection algorithm, the second detection algorithm utilizing a different set of detection metrics compared to the first detection algorithm, the second detection algorithm configured to monitor a second set of events in the computing environment and apply a second baseline value associated with a grouping of user accounts that includes the particular user account, wherein the detector is configured to execute the second detection algorithm with respect to the second set of events; and
        a remediator configured to perform a remediation action in response to an abnormal event detected in the computing environment by the second detection algorithm.

2. The system of claim 1, wherein the set of constraint metrics includes at least one parameter associated with the usage of a processor, memory, or a network of the computing device.

3. The system of claim 1, wherein the first detection algorithm is configured to apply a first set of detection metrics to monitor the first set of events in the computing environment, the first set of detection metrics including a first metric that identifies an anomaly level of a data access, a second metric that identifies a significance level of the data access, and a third metric that identifies an interest level of the data access.

4. The system of claim 1, wherein the second detection algorithm is a spike detection algorithm configured to detect a data access spike that exceeds the second baseline value.

5. The system of claim 4, wherein the computing environment comprises a database.

6. The system of claim 4, wherein the first detection algorithm is configured to apply a first set of baseline values to monitor the first set of events in the computing environment, and
    wherein the second detection algorithm is configured to apply a subset of the first set of baseline values to monitor the second set of events in the computing environment.

7. The system of claim 6, wherein the first set of baseline values includes a plurality of baseline values associated with each of a plurality of principals, and an application-level baseline value.

8. A method for adapting a detection algorithm, the method comprising:
    executing a first detection algorithm that monitors a first set of events in a computing environment and applies a first baseline value associated with a particular user account to the first set of events;

monitoring a set of constraint metrics in the computing environment, the constraint metrics indicative of an amount of computing resources utilized by the first detection algorithm;

regenerating the first detection algorithm based on the monitored set of constraint metrics to generate a second detection algorithm, the second detection algorithm utilizing a different set of detection metrics compared to the first detection algorithm, the second detection algorithm configured to monitor a second set of events in the computing environment and apply a second baseline value associated with a grouping of user accounts that includes the particular user account;

executing the second detection algorithm with respect to the second set of events; and performing a remediation action in response to an abnormal event detected in the computing environment by the second detection algorithm.

9. The method of claim 8, wherein the set of constraint metrics includes at least one parameter associated with the usage of a processor, memory, or a network of the computing device.

10. The method of claim 8, wherein the first detection algorithm is configured to apply a first set of detection metrics to monitor the first set of events in the computing environment, the first set of detection metrics including a first metric that identifies an anomaly level of a data access, a second metric that identifies a significance level of the data access, and a third metric that identifies an interest level of the data access.

11. The method of claim 8, wherein the second detection algorithm is a spike detection algorithm configured to detect a data access spike that exceeds the second baseline value.

12. The method of claim 11, wherein the computing environment comprises a database.

13. The method of claim 11, wherein the first detection algorithm is configured to apply a first set of baseline values to monitor the first set of events in the computing environment, and wherein the second detection algorithm is configured to apply a subset of the first set of baseline values to monitor the second set of events in the computing environment.

14. The method of claim 13, wherein the first set of baseline values includes a plurality of baseline values associated with each of a plurality of principals, and an application-level baseline value.

15. A computer-readable storage medium having program instructions recorded thereon that, when executed by at least one processor of a computing device, perform a method, the method comprising:

executing a first detection algorithm that monitors a first set of events in a computing environment and applies a first baseline value associated with a particular user account to the first set of events;

monitoring a set of constraint metrics in the computing environment, the constraint metrics indicative of an amount of computing resources utilized by the first detection algorithm;

regenerating the first detection algorithm based on the monitored set of constraint metrics to generate a second detection algorithm, the second detection algorithm utilizing a different set of detection metrics compared to the first detection algorithm, the second detection algorithm configured to monitor a second set of events in the computing environment and apply a second baseline value associated with a grouping of user accounts that includes the particular user account;

executing the second detection algorithm with respect to the second set of events; and performing a remediation action in response to an abnormal event detected in the computing environment by the second detection algorithm.

16. The computer-readable storage medium of claim 15, wherein the set of constraint metrics includes at least one parameter associated with the usage of a processor, memory, or a network of the computing device.

17. The computer-readable storage medium of claim 15, wherein the first set of baseline values includes a plurality of baseline values associated with each of a plurality of principals, and an application-level baseline value.

18. The computer-readable storage medium of claim 15, wherein the first detection algorithm is configured to apply a first set of detection metrics to monitor the first set of events in the computing environment, the first set of detection metrics including a first metric that identifies an anomaly level of a data access, a second metric that identifies a significance level of the data access, and a third metric that identifies an interest level of the data access.

19. The computer-readable storage medium of claim 15, wherein the second detection algorithm is a spike detection algorithm configured to detect a data access spike that exceeds the second baseline value.

20. The computer-readable storage medium of claim 19, wherein the first detection algorithm is configured to apply a first set of baseline values to monitor the first set of events in the computing environment, and wherein the second detection algorithm is configured to apply a subset of the first set of baseline values to monitor the second set of events in the computing environment.

* * * * *